US012525848B2

(12) United States Patent
Singh

(10) Patent No.: US 12,525,848 B2
(45) Date of Patent: Jan. 13, 2026

(54) THREE SPEED GEAR REDUCER FOR ELECTRIC DRIVE MODULE

(71) Applicant: FCA US LLC, Auburn Hills, MI (US)

(72) Inventor: Tejinder Singh, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 160 days.

(21) Appl. No.: 18/493,877

(22) Filed: Oct. 25, 2023

(65) Prior Publication Data

US 2025/0141302 A1 May 1, 2025

(51) Int. Cl.
| | | |
|---|---|---|
| H02K 7/116 | (2006.01) | |
| H02K 7/00 | (2006.01) | |
| H02K 7/108 | (2006.01) | |

(52) U.S. Cl.
CPC ............. *H02K 7/116* (2013.01); *H02K 7/006* (2013.01); *H02K 7/108* (2013.01); *F16H 2200/0021* (2013.01); *F16H 2200/0039* (2013.01); *F16H 2200/201* (2013.01); *F16H 2200/2038* (2013.01); *F16H 2200/2097* (2013.01)

(58) Field of Classification Search
CPC ........ H02K 7/116; H02K 7/006; H02K 7/108; F16H 2200/0021; F16H 2200/0039; F16H 2200/201; F16H 2200/2038; F16H 2200/2097
See application file for complete search history.

(56) References Cited

U.S. PATENT DOCUMENTS

| | | | |
|---|---|---|---|
| 7,150,695 B2 * | 12/2006 | Usoro ..................... | F16H 3/666 475/296 |
| 9,494,217 B2 * | 11/2016 | Hart ........................ | F16H 3/663 |
| 2006/0246794 A1 * | 11/2006 | Foster .................... | B60K 6/445 440/86 |
| 2015/0184725 A1 * | 7/2015 | Beck ....................... | F16H 3/666 475/275 |
| 2016/0040757 A1 * | 2/2016 | Beck ......................... | F16H 3/66 475/278 |
| 2016/0273650 A1 * | 9/2016 | Fujii .................... | F16H 61/0265 |
| 2019/0344652 A1 * | 11/2019 | Kasahara ................ | B60K 6/26 |
| 2020/0406739 A1 * | 12/2020 | Singh ....................... | B60K 6/48 |
| 2023/0139069 A1 * | 5/2023 | Rittler ................... | F16H 37/082 475/204 |
| 2024/0416747 A1 * | 12/2024 | Kaltenbach .............. | B60K 1/00 |
| 2024/0418244 A1 * | 12/2024 | Kaltenbach ............. | F16H 63/32 |

* cited by examiner

*Primary Examiner* — Farhana Pervin
(74) *Attorney, Agent, or Firm* — Jeremy J. Klobucar

(57) ABSTRACT

A three-speed gearbox assembly for an electric drive module (EDM) of an electric vehicle includes a housing, a first and second planetary gear set, and a first, second, third and fourth clutch. The first planetary gear set is configured to selectively connect to an output of an electric motor and includes a first sun gear, a first ring gear and a first planetary carrier. The second planetary gear set is rotationally coupled to an output of the first planetary gear set and includes a second sun gear, a second ring gear and a second planetary carrier. The first clutch selectively couples the first carrier to the housing. The second clutch selectively couples the first sun gear to the housing. The third clutch selectively couples the output of the electric motor to the first sun gear. The fourth clutch selectively couples the output of the electric motor to the first carrier.

18 Claims, 3 Drawing Sheets

|    | B1 | B2 | C3 |
|----|----|----|----|
| G1 | X  |    |    |
| G2 |    | X  |    |
| G3 |    |    | X  |

FIG. 3 ly, and durability characteristics. In an example implementation, the three-speed gearbox includes three planetary gear sets and three clutches. As will be described herein in more detail, the clutches enable selective coupling for shifting between the three gears.

THREE SPEED GEAR REDUCER FOR ELECTRIC DRIVE MODULE

FIELD

The present application relates generally to electric drive modules for electric vehicles and, more particularly, to a three-speed electric drive module for an electrified vehicle.

BACKGROUND

Electric vehicles typically have single speed gearboxes, which while providing great torque capability on the road, are unable to provide sustained high torque for trail and desert driving or various other speeds. Such gearboxes may provide sustained high torque through higher ratio gearing, but this is not ideal for meeting range and performance requirements for on-road and off-road usage. Moreover, such gearboxes often have relatively complex gearing arrangements and increased packaging constraints. Accordingly, while such gearing systems work well for their intended purpose, there is a desire for improvement in the relevant art.

SUMMARY

In accordance with one example aspect of the invention, a three-speed gearbox assembly for an electric drive module (EDM) of an electric vehicle is provided. The gearbox assembly includes a housing, a first planetary gear set, a second planetary gear set, third planetary gear set, a first clutch, a second clutch, and a third clutch. The first planetary gear set includes a first sun gear and a first planetary carrier. The second planetary gear set is rotationally coupled to first planetary carrier of the first planetary gear set and includes a second sun gear, a second ring gear and a second planetary carrier. The third planetary gear set is rotationally coupled to an output of an electric motor and includes a third sun gear, a third ring gear and a third planetary carrier. The first clutch selectively couples the first carrier to the housing. The second clutch selectively couples the first sun gear to the housing. The third clutch selectively couples the first sun gear and the second sun gear.

In examples, the gearbox assembly is selectively switchable between (i) a first gear where the first clutch is engaged and the second and third clutches are disengaged; (ii) a second gear where the first clutch and the third clutch are disengaged and the second clutch is engaged; and (iii) a third gear where the third clutch is engaged and the first and second clutches are disengaged.

In addition to the foregoing, the first clutch can be configured as a brake clutch. In examples, first clutch can be configured as a dog clutch.

In addition to the foregoing, the second clutch can be configured as a brake clutch. In examples, the second clutch can be a selectable one-way clutch (SOWC).

In addition to the foregoing, the second planetary carrier can drive a gear wheel that drives a differential. The gear wheel is selectively coupled to drive axles through the differential In examples, the differential is one of an electrically and mechanically locking differential.

In accordance with one example aspect of the invention, an electric vehicle is provided. The electric vehicle includes an electric motor having an output shaft and first and second axle shafts. A three-speed gearbox assembly includes a housing, a first planetary gear set, a second planetary gear set, third planetary gear set, a first clutch, a second clutch, and a third clutch. The first planetary gear set includes a first sun gear, a first ring gear and a first planetary carrier. The second planetary gear set is rotationally coupled to first planetary carrier of the first planetary gear set and includes a second sun gear, a second ring gear and a second planetary carrier. The third planetary gear set is rotationally coupled to an output of an electric motor and includes a third sun gear, a third ring gear and a third planetary carrier. The first clutch selectively couples the first carrier to the housing. The second clutch selectively couples the first sun gear to the housing. The third clutch selectively couples the first sun gear and the second sun gear.

In examples, the gearbox assembly is selectively switchable between (i) a first gear where the first clutch is engaged and the second and third clutches are disengaged; (ii) a second gear where the first clutch and the third clutch are disengaged and the second clutch is engaged; and (iii) a third gear where the third clutch is engaged and the first clutch and the second clutch are disengaged.

In addition to the foregoing, the first clutch can be configured as a brake clutch. In examples, first clutch can be configured as a dog clutch.

In addition to the foregoing, the second clutch can be configured as a brake clutch. In examples, the second clutch can be a selectable one-way clutch (SOWC).

In addition to the foregoing, the second planetary carrier can drive a gear wheel that drives a differential. The gear wheel is selectively coupled to drive axles through the differential In examples, the differential is one of an electrically and mechanically locking differential.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a table illustrating engagement of various clutches in connection with shifting various gears of the gearbox assembly shown in FIG. 2, in accordance with the principles of the present application.

DETAILED DESCRIPTION

According to the principles of the present application, systems and methods are described for an electric drive module (EDM) of an electric vehicle (EV). The EDM includes a three-speed electric drive gearbox configured to provide a power-shift with maximum power density, efficiency, and minimum cost while maintaining NVH, reliability, durability, and shift quality. A first example of the EDM includes three planetary gearsets, a pair of multi-plate brakes, and a multi-plate clutch. The EDM provides a first drive gear that is generally referred to as (range selectable) 2-LO or 4-LO and capable of meeting high torque requirements such as associated with heavy towing, trail terrain, vehicle recovery and stump removal. The EDM provides a second and third gear that are generally referred to as (power shiftable) 2-HI or 4-HI and capable of meeting torque requirements such as associated with road and desert driving.

Figure 1:
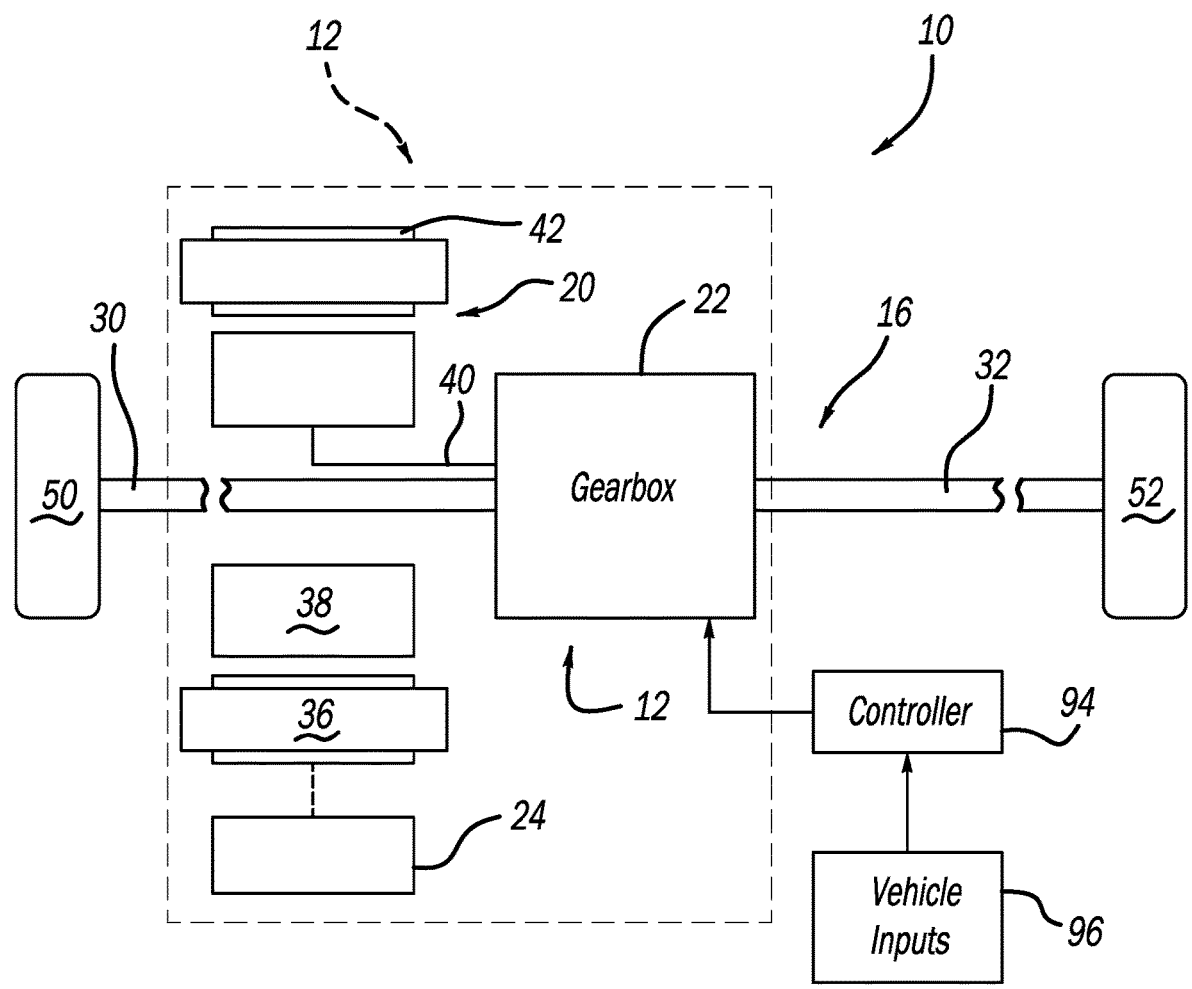
FIG. 1 is a schematic illustration of an example electric vehicle drivetrain having an electric drive module with a three-speed gearbox assembly, in accordance with the principles of the present application.

With initial reference to FIG. 1, a vehicle 10 is partially shown in accordance with the principles of the present disclosure. In the example embodiment, vehicle 10 includes an electric drive module (EDM) 12 configured to generate and transfer drive torque to a driveline 16 for vehicle propulsion. The EDM 12 generally includes one or more electric drive units or motors 20 (e.g., electric traction motors), an electric drive gearbox assembly 22, and power electronics including a power inverter module (PIM) 24.

The electric motor 20 is selectively connectable via the PIM 24 to a high voltage battery system (not shown) for powering the electric motor 20. The gearbox assembly 22 is configured to transfer the generated drive torque to the driveline 16, including a first or left axle shaft 30 and a second or right axle shaft 32. In the example shown, the EDM 12 is configured for use on a rear axle of a two-wheel drive vehicle. It is appreciated however that the EDM 12 can be alternatively configured for use on a front axle of a two-wheel drive vehicle. In other examples an EDM 12 can be provided on both of the front and rear axles for a four-wheel drive or all-wheel drive driveline vehicle.

In the example embodiment, the electric motor 20 generally includes a stator 36, a rotor 38, and a rotor output shaft 40. The stator 36 is fixed (e.g., to a housing 42) and the rotor 38 is configured to rotate relative to the stator 36 to drive the rotor shaft 40 and thus the vehicle axles 30, 32 (e.g., half shafts) and therefore respective drive wheels 50, 52. In the illustrated example, the EDM 12 is configured for a rear axle (axles 30, 32) of the vehicle 10, but it will be appreciated that the systems and methods described herein are equally applicable to a front axle EDM configuration, and can be replicated on the front and rear axles for four wheel drive.

Figure 2:
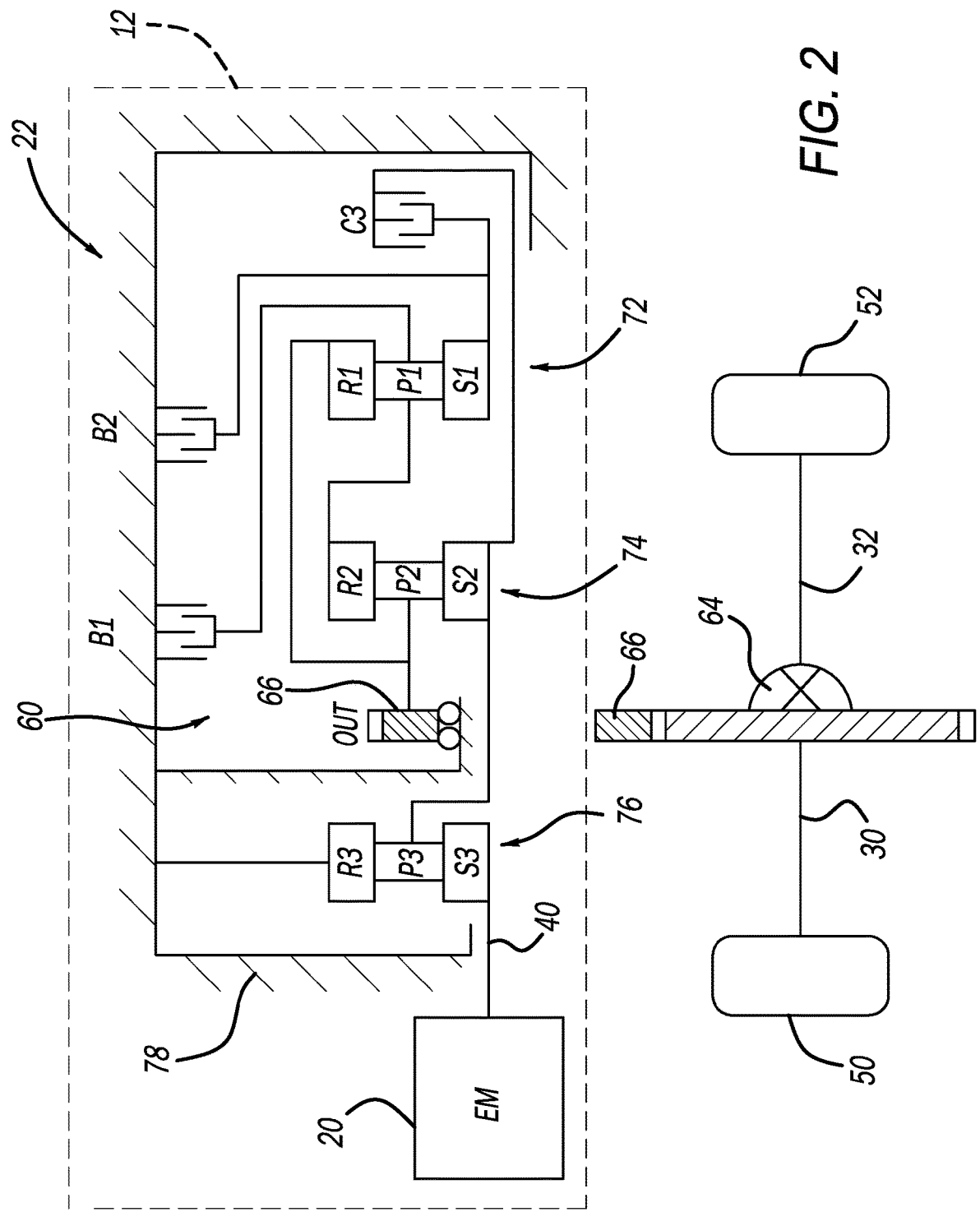
FIG. 2 is a schematic diagram of one example configuration of the gearbox assembly shown in FIG. 1, in accordance with the principles of the present application.

With reference now to FIG. 2, the three-speed coaxial gearbox assembly 22 will be described in more detail. In the example embodiment, the gearbox assembly 22 is coupled to the electric motor 20 through the output shaft 40. Rotational output from the motor output shaft 40 is received by the gearbox assembly 22, which then transfers the rotational output through a gear set 60 to the axles 30, 32. In the example shown, a differential 64 receives a drive output (as described below) such as from a gear wheel 66 and delivers output torque to the axles 30, 32 and therefore the drive wheels 50, 52. The differential 64 can be an open differential or can be configured as a locking differential such as an electrically or mechanically locking differential.

In the example embodiment, the gear set 60 includes a first planetary gear set 72, a second planetary gear set 74, a third planetary gear set 76 and a housing 78. The three planetary gear sets 72, 74, and 76 each generally include a sun gear 'S', a planetary carrier 'P' supporting planet gears, and a ring gear 'R', where suffixes '1', '2', and '3' refer to the first, second and third planetary gear sets 72, 74, and 76. The gearbox assembly 22 also includes a first Clutch or Brake B1, a second Clutch or Brake B2, and a third Clutch C3.

In the illustrated example, the first Brake B1 and second Brake B2 are both multi-plate clutches. However, it will be appreciated that first Brake B1 and/or the second Brake B2 may be any suitable type of clutch that enables gearbox assembly 22 to function as described herein. In examples, a first gear is range selectable using the first Brake B1 as a dog clutch. A second and third gear can be power shiftable with the second Brake B2 used as a friction clutch or a selectable one-way clutch (SOWC) and the third Clutch C3 used as a friction clutch.

In the example implementation, the third planetary gear set 76 is positioned between the electric motor 20 and the second planetary gear set 74. The second planetary gear set 74 is positioned between the first planetary gear set 72 and the third planetary gear set 76. The output shaft 40 of the electric motor 20 is rotatably coupled to the third sun gear S3 of the third planetary gear set 76. The third ring gear R3 is grounded to the housing 78. The third carrier P3 is rotatably coupled to the second sun gear S2 of the second planetary gear set 74. The second ring gear R2 is rotatably coupled to the first carrier P1 of the first planetary gear set 72. The second carrier P2 is rotatably coupled to the differential 64. The first ring gear R1 of the first planetary gear set 72 is rotatably coupled to the differential 64. The first carrier P1 is rotatably coupled to the first Brake B1. The first sun gear S1 is selectively rotatably coupled to the second Brake B2 and the third clutch C3. The third clutch C3 is also selectively rotatably coupled to the second sun gear S2.

Figure 3:
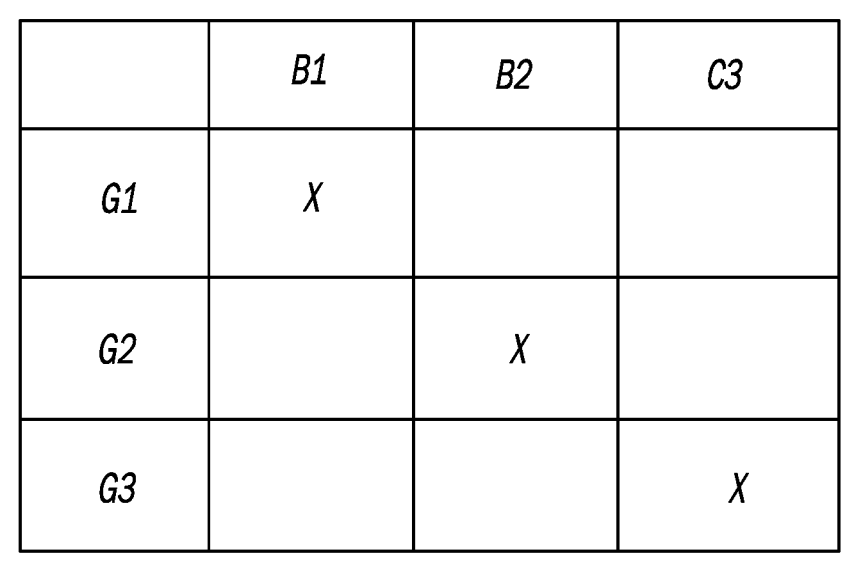

Using the EDM 12 to deliver drive torque from the electric motor 20, through the gearbox 22 and to the drive wheels 50, 52 will be described. FIG. 3 illustrates an exemplary shift pattern for the three-speed gearbox assembly 22. The table illustrates the combination of clutches and brakes engageable to achieve specific torque input-to-output ratios. In the example tables, each clutch and brake combination corresponds to one of three forward gears (G1, G2, G3). Moreover, the gearbox assembly 16 utilizes planetary gear sets 72, 74 and 76 as a ratio but also to provide an open differential function.

Description will now be made directed toward a vehicle operator selecting 2-LO or 4-LO and capable of meeting high torque requirements corresponding to first gear G1. The gearbox 22 operates in a first gear G1 by engaging the first Brake B1. In examples, the first Brake B1 can be selected at zero vehicle speed. As used herein, "engaging" is used to mean closing a clutch to transmit torque. In examples, the first gear G1 can be associated with a 4 wheel Low drive gear setting. By engaging the first Brake B1, the first carrier P1 of the first planetary gear set 72 is grounded to the housing 78. Rotation from the output shaft 40 provided by the electric motor 20 is transferred through the third carrier P3, through the second planetary gear set 74 and to the first planetary gear set 72 through the first carrier P1. Rotation from the first ring gear R1 and second carrier P2 leads to the drive wheels 50, 52 by way of the gear 66 and differential 64.

Description will now be made directed toward a vehicle operator selecting 2-HI or 4-HI and capable of meeting lower torque requirements and higher vehicle speeds corresponding to second and third gears G2 and G3. As identified above, the second Brake B2 and the third clutch C3 are power shiftable. When a second gear is desired, or to shift operation to gear G2, the second Brake B2 is engaged. The second gear can be suitable for low friction driving conditions such as sand. In some examples, a shift to gear G2 can be referred to as a shift to a 4 wheel High drive gear setting.

Actuation of the third clutch C3 can enable shifting into the third gear G3. In examples, shifting between the second and third gears G2 and G3 can be done automatically based on an input from a controller 94. The controller 94 can make determinations whether to shift between the second and third gears G2 and G3 based on vehicle inputs 96 such as wheel speeds and operating conditions related to the electric motor 20 and/or driveline 16.

By engaging the second Brake B2, the first sun gear S1 is grounded to the housing 78 and the first carrier is free to rotate relative to the first ring gear R1 of the first planetary gear set 72. Rotatable movement of the third carrier P3 is received by the second sun gear S2. Rotatable movement of the second carrier P2 and the first ring gear R1 are output to the gear 66 that feeds the differential 64 and ultimately the drive wheels 50, 52.

If a third gear is desired, such as by the controller 94, the second Brake B2 is opened while the third Clutch C3 is also applied. By engaging the third Clutch C3, rotation of the second sun gear S2 is fixed to rotation of the first sun gear S1. Rotatable movement of the third carrier P3 is received by the second sun gear S2 and transferred to the first sun gear S1. Rotatable movement of the second carrier P2 and the first ring gear R1 are output to the gear 66 that feeds the differential 64 and ultimately the drive wheels 50, 52.

Described herein are systems and methods for a three-speed electric drive gearbox assembly 22 for an electric vehicle 10. The three-speed gearbox assembly 22 is configured to provide various gear ratios such as on-road and off-road gear ratios. To achieve the three-speed functionality, the gearbox assembly 22 includes three planetary gear sets 72, 74, and 76 with selectively engageable clutches B1, B2 and C3. As such, the described gearbox assembly 22 advantageously does not require individual electric drive modules for each wheel or complex controls/mechanisms.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A three-speed gearbox assembly for an electric drive module (EDM) of an electric vehicle, the three-speed gearbox assembly comprising:
   a housing;
   a first planetary gear set including a first sun gear, a first ring gear and a first planetary carrier;
   a second planetary gear set rotationally coupled to the first planetary carrier of the first planetary gear set, the second planetary gear set including a second sun gear, a second ring gear and a second planetary carrier;
   a third planetary gear set rotationally coupled to an output of the electric motor, the third planetary gear set including a third sun gear, a third ring gear and a third planetary carrier;
   a first clutch that selectively couples the first carrier to the housing;
   a second clutch that selectively couples the first sun gear to the housing;
   a third clutch that selectively couples the first sun gear and the second sun gear; and
   wherein the gearbox assembly is selectively switchable between (i) a first gear where the first clutch is engaged and the second and third clutches are disengaged; (ii) a second gear where the first clutch and the third clutch are disengaged and the second clutch is engaged; and (iii) a third gear where the third clutch is engaged and the first and second clutches are disengaged.

2. The three-speed gearbox assembly of claim 1, wherein the first clutch is a brake clutch.

3. The three-speed gearbox assembly of claim 2, wherein the first clutch is a dog clutch.

4. The three-speed gearbox assembly of claim 1, wherein the second clutch is a brake clutch.

5. The three-speed gearbox assembly of claim 4, wherein the second clutch is a selectable one-way clutch (SOWC).

6. The three-speed gearbox assembly of claim 1, wherein the third clutch is a friction clutch.

7. The three-speed gearbox assembly of claim 1, wherein the second planetary carrier drives a gear wheel that drives a differential.

8. The three-speed gearbox assembly of claim 7, wherein the gear wheel is coupled to drive axles through the differential.

9. The three-speed gearbox assembly of claim 8, wherein the differential is one of an electrically and mechanically locking differential.

10. An electric vehicle, comprising:
    an electric motor having an output shaft;
    first and second axle shafts; and
    a three-speed gearbox assembly operably coupled between the electric motor and the first and second axle shafts, the three-speed gearbox assembly comprising:
       a housing;
       a first planetary gear set including a first sun gear, a first ring gear and a first planetary carrier;
       a second planetary gear set rotationally coupled to the first planetary carrier of the first planetary gear set, the second planetary gear set including a second sun gear, a second ring gear and a second planetary carrier;
       a third planetary gear set rotationally coupled to the output shaft of the electric motor, the third planetary gear set including a third sun gear, a third ring gear and a third planetary carrier;
       a first clutch that selectively couples the first carrier to the housing;
       a second clutch that selectively couples the first sun gear to the housing;
       a third clutch that selectively couples the first sun gear and the second sun gear; and wherein the gearbox assembly is selectively switchable between (i) a first gear where the first clutch is engaged and the second and third clutches are disengaged; (ii) a second gear where the first clutch and the third clutch are disengaged and the second clutch is engaged; and (iii) a third gear where the third clutch is engaged and the first and second clutch are disengaged.

11. The vehicle of claim 10, wherein the first clutch is a brake clutch.

12. The vehicle of claim 11, wherein the first clutch is a dog clutch.

13. The vehicle of claim 10, wherein the second clutch is a brake clutch.

14. The vehicle of claim 10, wherein the second clutch is a selectable one-way clutch (SOWC).

15. The vehicle of claim 10, wherein the third clutch is a friction clutch.

16. The vehicle of claim 10, wherein the second planetary carrier drives a gear wheel that drives a differential.

17. The vehicle of claim 16, wherein the gear wheel is coupled to drive axles through the differential.

18. The vehicle of claim 17, wherein the differential is one of an electrically and mechanically locking differential.

\* \* \* \* \*